United States Patent [19]

Coassolo et al.

[11] Patent Number: 4,923,955

[45] Date of Patent: May 8, 1990

[54] THERMOTROPIC LIQUID-CRYSTALLINE AROMATIC POLYESTERS OF SUBSTITUTED 4,4'-DIHYDROXY-DIPHENYLENE

[75] Inventors: Alfredo Coassolo, Novara; Giampiero Sabarino, Vercelli; Marco Foa'; L. Lawrence Chapoy, both of Novara, all of Italy

[73] Assignee: Montedison S.p.A., Milan, Italy

[21] Appl. No.: 273,843

[22] Filed: Nov. 21, 1988

[30] Foreign Application Priority Data

Nov. 24, 1987 [IT] Italy .................................. 22746 A/87

[51] Int. Cl.[5] .......................... C08G 63/02; C08G 8/02
[52] U.S. Cl. .................................... 528/193; 528/125; 528/176; 528/192

[58] Field of Search ................. 528/125, 176, 192, 193

[56] References Cited

U.S. PATENT DOCUMENTS 4,562,242 12/1985 Mark et al. ........................... 528/193
4,579,934 4/1986 Brinkmeyer et al. ................ 528/193

Primary Examiner—Harold D. Anderson
Assistant Examiner—T. Mosley
Attorney, Agent, or Firm—Stevens, Davis, Miller & Mosher

[57] ABSTRACT

Thermotropic liquid-crystalline aromatic polyesters of 4,4'-dihydroxy-diphenyl substituted with a halogen or with an alkyl, cycloalkyl, aryl, aralkyl, keto or ether radical.

10 Claims, No Drawings

THERMOTROPIC LIQUID-CRYSTALLINE AROMATIC POLYESTERS OF SUBSTITUTED 4,4'-DIHYDROXY-DIPHENYLENE

DESCRIPTION OF THE INVENTION

The present invention relates to thermotropic liquid-crystalline aromatic polyesters.

More particularly, the present invention relates to thermotropic liquid-crystalline aromatic polyesters easily processable in the molten state, and having the mesogen group in their main chain.

Thermotropic polyesters, which hence show an optical anisotropy in the molten state, are products known and described in many examples in the technical literature, such as in British Polymer Journal (Dec. 1980), page 154: "Liquid Crystal Polymer;" Journal of Macromolecular Science-Chemistry (1984), page 1705: "Liquid Crystalline Aromatic Polyesters;" Die Augewandte Makromolekulare Chemie (1982), 109-110, page 1: "Rigid Chain Polymers;" Die Augewandte Makromolekulare Chemie (1986), 145-146, page 231: "Thermotropic Liquid Crystalline Polymers;" Journal of Molecular Science Review (1986) C26(4), page 551: "Liquid Crystalline Polymers: A Novel State of Material."

The use of such polyesters makes it possible to obtain films or fibers of molded articles, for example, by injection-molding, which have suitable characteristics of stiffness, hardness and tenacity.

The polymers showing the above properties are generally easily processable in the molten state, highly resistant to heat and oxidation and furthermore, thanks to their crystallinity, such polymers display high HDT (Heat Distortion Temperature) values and are highly resistant to attack by solvents.

The polymers which can be obtained by the polycondensation of terephthalic acid and 4,4'-dihydroxydiphenyl melt at too high temperatures to be capable of being easily processed. One route used in order to decrease their melting point consists in using a plurality of substituents on the aromatic rings of the diphenol, or of the terephthalic acid, or in modifying the polymer by means of the addition of other comonomers.

U.S. Pat. No. 3,637,595 discloses the preparation of thermotropic liquid-crystalline polyesters by the polycondensation of 4,4'-dihydroxy-diphenyl, terephthalic acid, and p-hydroxy-benzoic acid. The so-obtained polymer, even though showing high mechnical characteristics and high resistance to oxidation and to attack by solvents, has a high melting point—higher than 420° C.—and is therefore difficult to process, or any event it requires nonconventional equipment for injection-molding.

In U.S. Pat. No. 3,975,487, the above drawback was partially overcome by using "bent" co-monomers, such as isophthalic acid, the presence of which, however, in the event their amounts are large, may lead to the disappearance of the liquid-crystalline characteristics of the end polymer. Furthermore, although the product obtained has a melting point lower than 400° C., this is still so high as to make the polymer difficult to process.

The Journal of Polymer Science: Polymer Physics Edition, vol. 21, 1119, describes the preparation of polyesters by starting from 4,4'-dihydroxy-diphenyl and several aliphatic diacids. However, such polymers, owing to the presence of aliphatic-chain compounds, have not very interesting physical-mechanical properties.

U.S. Pat. No. 4,617,370 discloses the preparation of liquid-crystalline polymers by starting from 4,4'-dihydroxy-diphenyl substituted in its 3,3', 5,5'-positions with phenyl radicals, or alkyl or alkoxy radicals having a lower number of carbon atoms, and, in at least one of its 2,2',6,6'-positions, with a halogen. This monomer unit is reacted with dicarboxy aromatic acids and with hydroxy aromatic acids, and the so-obtained polymer has a melting point within the range of from 270° to 350° C. However, according to this patent, a polymer endowed with liquid-crystalline properties can only be obtained if in the polymerization mixture the hydroxy aromatic acid is used; otherwise the obtained polymer will be isotropic in the molten state.

In European patent application No. 201,831, thermotropic liquid-crystalline polyesters are disclosed which are obtained by the polycondensation of a dicarboxy aromatic acid and 4,4'-dihydroxy-diphenyl substituted in its 3,3'-positions with two phenyl radicals. In this case, too, the product obtained has a high melting point, higher than 350° C., and it is hence difficult to be processed and to be converted into useful end articles.

In accordance with the present invention, it has now been discovered that the above drawbacks may be overcome if mono-substituted derivatives of 4,4'-diphenyl are used.

Therefore, the object of the present invention are the thermotropic liquid-crystalline aromatic polyesters which comprise:

(a) at least one unit derived from essentially monosubstituted phenols having the formula:

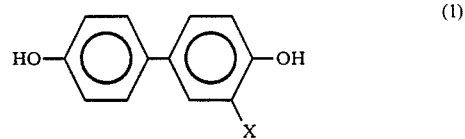

(1)

wherein:
X represents a halogen or an alkyl radical containing from 1 to 6 carbon atoms, an aralkyl radical containing at least 7 carbon atoms and preferably from 7 to 15 carbon atoms, a cycloalkyl, single aryl, double aryl or condensed aryl radical containing from 6 to 18 carbon atoms, a keto group —COR or an ether group —OR, wherein R is an alkyl or aryl radical containing from 1 to 12 carbon atoms, and which may be substituted with groups inert under the reaction conditions, such as the halogens or the alkyl radical with a small number of carbon atoms;

(b) at least one unit derived from dicarboxy acids of the formula:

(2)

wherein:
$R_1$ represents a cycloalkyl, a single, double or condensed aryl radical containing from 6 to 18 carbon atoms, and which may be substituted with groups inert under the reaction conditions, such as halogens, or alkyl radicals containing a small number of carbon atoms;

(c) if desired, at least one unit derived from hydroxyacids of the formula:

$$HO-Ar_1-(CH=CH)_n-COOH \qquad (3)$$

wherein:

Ar$_1$ represents a single, double or condensed aryl radical containing from 1 to 18 carbon atoms, and which may be substituted with groups inert under the reaction conditions, such as the halogens or the alkyl radicals containing a small number of carbon atoms, and n is equal to either 0 or 1; and (d) if desired, at least one unit derived from diphenols having the formula:

$$HO-Ar_2-OH \qquad (4)$$

wherein:

Ar$_2$ represents a single or condensed aryl radical containing from 6 to 18 carbon atoms, and which may be substituted with at least one X radical, or a double, unsubstituted aryl radical.

By the term "alkyl radicals containing a small number of carbon atoms," as used in the present specification and claims, alkyl radicals containing from 1 to 4 carbon atoms are meant.

According to a preferred form of practical embodiment of the polyesters according to the present invention, the diphenols as defined under (a) are essentially mono-substituted; however, blends containing also di-substituted derivatives may be used as well. In such blends, the content of di-substituted diphenol, preferably substituted in its 3- and 3'-positions, may vary over a wide range; however, blends containing up to 20 mol % of di-substituted derivative are the most commonly used.

According to a further preferred form of practical embodiment of the polyesters according to the present invention, at least 90 mol % of the products of the formulae (2), (3), and (4) have both their functional groups in such positions as to form a polymeric chain with a substantially coaxial or parallel direction.

Examples of substituted diphenols of the formula (1) are chloro, bromo-4,4'-dihydroxy-diphenyl; methyl, ethyl, propyl, butyl-4,4'-dihydroxy-diphenyl; tert.-butyl-4,4'-dihydroxy-diphenyl; cyclohexyl-4,4'-dihydroxy-diphenyl; phenyl-ethyl-4,4'-dihydroxy-diphenyl; (1-methyl-1-phenyl-ethyl))-4,4'-dihydroxy-diphenyl; naphthyl-4,4'-dihydroxy-diphenyl; acetyl-4,4'-dihydroxy-diphenyl; propionyl-4,4'-dihydroxy-diphenyl; benzoyl,1,4,4'-dihydroxy-diphenyl; methoxy-4,4'-dihydroxy-diphenyl; phenoxy-4,4'-dihydroxy-diphenyl; phenyl-4-4'-dihydroxy-diphenyl; and so forth.

Examples of dicarboxy aromatic acids having the general formula (2) are terephthalic acid; chloro, bromoterephthalic acid; methyl-terephthalic acid; 1-4-napthalenedicarboxy acid; 1,5-naphthalene-dicarboxy acid; and 2,6-naphthalene-dicarboxy acid; 4,4'-diphenyl-dicarboxy acid; 3,3'-dibromo-4,4'-diphenyl-dicarboxy acid; 4,4'-stilbenedicarboxy acid; and so forth.

Examples of hydroxy acids having the formula (3) are p-hydroxy-benzoic acid; 3-chloro-4-hydroxy-benzoic acid; 3-bromo-4-hydroxy-benzoic acid; 3,5-dichloro-4-hydroxy-benzoic acid; 3-methyl-4-hydroxy-benzoic acid; 3-tert.-butyl-4-hydroxy-benzoic acid; 4-hydroxy-1-naphthoic acid; 6-hydroxy-2naphthoic acid; p-(4-hydroxy-phenyl)-benzoic acid; p-hydroxycinnamic acid; and so forth.

Examples of aromatic diols of the formula (4) are hydroquinone; methyl, ethyl, propyl, tert.-butyl hydroquinone; phenyl-hydroquinone; (1-phenyl-ethyl)-hydroquinone; 2,5-bis(phenyl-ethyl); 2-(alpha-phenyl-isopropyl)-hydroquinone; 2,5-bis(alpha-phenyl-isopropyl)-hydroquinone; cyclohexylhydroquinone; 4,4'-dihydroxy-diphenyl; 2,6-dihydroxynaphthalene; and so forth.

The thermotropic liquid-crystalline aromatic polyesters according to the present invention comprise units derived from the phenols as defined under (d) in molar ratios of (d)/(b) to the units derived from the hydroxyacids as defined under (a), which are within the range of from 0 to 1, whilst the units derived from the hydroxy acids as defined under (c) are in molar ratios (c)/(b) to the units derived from the acids as defined under (b), which are within the range of from 0 to 4.

The polymers of the present invention are optically anisotropic in the molten state, as can be verified by optical microscopy analysis under polarized light, and have an inherent viscosity, measured in a 1:1 mixture of trifluoroacetic acid and methylene chloride at 30° C. or in pentafluorophenol at 60° C., at a concentration of 0.25 g/liter, within the range of from 0.3 to 4.

Their melting temperature may vary over wide limits according to the composition of the polymer and the degree of polymerization. Generally, such melting temperature is within the range of from 200° to 350° C.

The molecular weight and the crystallinity may be increased by heating the polymer particles in an inert medium, or under vacuum, at a temperature just under the melting point, for a time ranging from 1 to 20 hours.

The polymers according to the present invention are well suited for use in obtaining fabricated bodies which may be prepared by means of the usual technologies of manufacture of thermoplastic polymers such as, e.g., injection molding or extrusion. They may be processed to yield films or fibers; they may be used as matrices for composite materials based on inorganic fibers or fillers; and they may be used in the preparation of blends with other polymers.

The preparation of the liquid-crystalline polymers according to the present invention may be carried out according to conventional techniques, by reacting the above mentioned units, available from the market, or easily preparable by means of the usual techniques of organic chemistry, under the normal conditions of preparation of polyester resins.

For example, the liquid-crystalline polyesters according to the present invention may be obtained in the molten state, or in the presence of a dispersing medium having a high boiling point, such as diphenyl-sulphone, or mixtures of partially hydrogenated terphenyls, by transesterification between the dicarboxy aromatic acids and the acetates or propionates of the phenols, and possible the hydroxy acids, at temperatures within the range of from 270° to 370° C, so as to favor the complete release of the carboxy acids, also operating under vacuum.

If desired, the reaction may be carried out in the presence of a transesterification catalyst such as, e.g., phosphates of alkali or alkaline-earth metals.

Further catalysts may be those which are commonly used in polycondensation processes, and are described in "Encyclopaedia of Polymer Science and Technology" (1969, Vol. 10, pages 722–723).

Examples of such catalysts are the oxides, hydroxides, hydrides, halides, alkoxides and phenates, the salts and the complex salts of the organic or inorganic acids of lithium, sodium, potassium, magnesium, calcium, titanium, manganese, cobalt, zinc, tin, antimony, lanthanum, cerium, lead and germanium.

The required amount of catalyst is within the range of from 0.005 to 1% by mol, and is preferably within the range of from 0.01 to 0.2% by mol, as computed relative to the total amount of the reactants.

According to an alternative method, the liquid-crystalline polyesters of the present invention may be obtained in solution by polycondensation between the halides of the dicarboxy aromatic acids and the mixture of the phenols in a suitable solvent. The temperature is within the range of from 25° to 220° C., and the reaction is carried out in the presence of a base and/or of a stream of nitrogen in order to favor the elimination of the hydrogen halide.

Among the bases, pyridine is preferred, whilst among the solvents, the chlorinated solvents both aliphatic and aromatic, are preferred, such as methylene chloride, chlorobenzene, dichloro-benzenes, and trichloro-benzenes.

The so-obtained polymer is subsequently recovered by evaporating the solvent, or by precipitation with a non-solvent, and subsequent filtration.

In order still better to understand the present invention and to practice it, here follow some illustrative, non-limiting examples:

EXAMPLE 1

Preparation of 3-phenylethyl-4,4'-dihydroxy-diphenyl

To a 5-neck glass flask of 500 cc capacity equipped with a mechanical stirrer, condenser, thermometer, and nitrogen inlet tube, 91.05 g (489 mM) of 4,4'-dihydroxydiphenyl, 330 cc of tetraethyleneglycol-dimethylether, and 8 g of p-toluenesulphonic acid monohydrate are charged under a slow nitrogen stream.

The temperature is increased to 140° C. with stirring and under a nitrogen stream, then 51 g (489 mM) of styrene is added dropwise over 2 hours.

The reaction mixture is maintained at this temperature for a further 5 hours.

When the reaction is ended, the mixture is cooled down to room temperature and is poured into ethyl ether.

The ethereal solution, after washing with water and sodium bicarbonate to neutrality, is dried over anhydrous sodium sulphate.

After filtration and solvent evaporation, the residue is fractionated over a silica-gel column, using methylene chloride as the eluent.

60 g is separated of 3-phenyl-ethyl-4,4'-dihydroxy-diphenyl, characterized by means of N.M.R. and gas-mass analysis.

EXAMPLE 2

Preparation of 3-(1-methyl-1-phenylethyl)-4,4'-dihydroxy-diphenyl

To a glass flask of 250 cc capacity, equipped with a mechanical stirrer, condenser, thermometer, and nitrogen inlet pipe, 34.2 (183.6 mM) of 4,4'-dihydroxy-diphenyl, 25 g (183.6 mM) of 2-phenyl-2-propanol, 4 g of p-toluenesulphonic acid monohydrate, and 150 cc of tetraethyleneglycol-dimethylether are charged under a slow nitrogen stream.

Still with stirring, and under a nitrogen stream, the temperature is increased to 140° C., and this temperature is maintained for 7 hours.

When the reaction is ended, the mixture is cooled down to room temperature and is poured into ethylether. The ethereal solution, after washing with water and then with a saturated solution of sodium bicarbonate to neutrality, is dried over anhydrous sodium sulphate.

After filtration and solvent evaporation, a solid residue of 23 g is obtained, which has the following gas-chromatographic composition:

| | |
|---|---|
| 4,4'-dihydroxy-diphenyl | 40.6% |
| 3-(1-methyl-1-phenylethyl)-4,4'dihydroxy-diphenyl | 53.2% |
| 3,3'-bis(1-methyl-1-phenylethyl)-4,4'-dihydroxy-diphenyl | 3.8% |
| reaction byproducts | 3.4% |

The solid residue is fractionated over a column filled with silica gel, using methylene chloride as the eluent.

11 g is obtained of 3-(1-methyl-1-phenyl-ethyl)-4,4'-dihydroxy-diphenyl, characterized by means of N.M.R. and gas-mass analysis, and having a melting point of about 143° C.

EXAMPLE 3

To a 4-neck flask of 100 cc capacity, equipped with a mechanical stirrer, condenser, thermometer and nitrogen inlet tube, 2.66 g (13.12 mM) of terephthalic acid dichloride, 3.72 g (12.82 mM) of 3-phenylethyl-4,4'-dihydroxy-diphenyl, 0.12 g (0.3 mM) of 3,3'-diphenylethyl-4,4'-dihydroxy-diphenyl, and 60 cc of 1,2,4,-trichloro-benzene are charged under a slow nitrogen stream.

The reaction mixture is kept 20 minutes with stirring and under a nitrogen stream at room temperature, and the temperature is then increased up to 200° C.

The reaction mixture is maintained at this temperature for 12 hours, until the evolution of HCl is practically ended. The mixture is allowed to cool, still under nitrogen stream and with stirring. When the reaction mixture is at the temperature of 50° C., the jelly-like mass is poured into acetone and the precipitate is filtered off.

The so-obtained polymer is washed with acetone (twice), hot water (twice), and acetone/methanol (twice).

The end product is dried under vacuum for 2 hours and 30 minutes at 180° –190° C.

The dried polymer has a melting temperature ($T_m$) of 290° C., and an inherent viscosity of 1.27 (as measured at the temperature of 30° C. in a solvent composed of equal volumes of trichloroacetic acid and of methylene chloride, at a concentration of 0.25 g/liter).

The molten polymer is optically anisotropic when observed at the microscope under polarized light.

EXAMPLES 4-5

Other polyesters are prepared according to the same procedure as described above in Example 3.

The amounts of the reactants and the characteristics of the polesters are listed in Table 1.

TABLE 1

| Example | (a) (mol) | (b) (mol) | (c) (mol) | (d) (mol) | Inherent Viscosity | Melting Temperature ($T_m$ in °C.) |
|---|---|---|---|---|---|---|
| 4 | 1 | 0.90 | 0.10 | — | 1.60 | 272 |

TABLE 1-continued

| Example | (a) (mol) | (b) (mol) | (c) (mol) | (d) (mol) | Inherent Viscosity | Melting Temperature ($T_m$ in °C.) |
|---|---|---|---|---|---|---|
| 5 | 1 | 0.80 | — | 0.20 | 1.80* | 283 |

(a) = terephthalic acid dichloride
(b) = 3-(phenyl-ethyl)-4,4'-dihydroxy-diphenyl
(c) = hydroquinone
(d) = 4,4'-dihydroxy-diphenyl
* = inherent viscosity, measured in pentafluoro-phenol at the temperature of 60° C., and at the concentration of 0.25 g/liter.

The polymers of Examples 4 and 5 are optically anisotropic in the molten state.

EXAMPLE 6

Using the same equipment and procedure as those of Example 3, 1.60 g (7.89 mM) of terephthalic acid dichloride, 2.4 g (7.89 mM) of 3-(1-methyl-1-phenyl-ethyl)-4,4'-dihydroxy-diphenyl, and 40 cc of 1,2,4-trichlorobenzene are charged.

The polymerization time is 16 hours.

The end product is dried under vacuum for 2 hours and 30 minutes at 180° –190° C.

The dried polymer has a melting temperature ($T_m$) of 325° C., and an inherent viscosity of 0.85.

The molten polymer is optically anisotropic when observed under the polarized-light microscope.

EXAMPLES 7–8

Other polyesters are prepared according to the same procedure as described in Example 6.

The amount of the reactants and the characteristics of the polyesters are listed below in Table 2.

TABLE 2

| Example | (a) (mol) | (b) (mol) | (c) (mol) | (d) (mol) | Inherent Viscosity | Melting Temperature ($T_m$ in °C.) |
|---|---|---|---|---|---|---|
| 7 | 1 | 0.90 | 0.10 | — | 0.55 | 300–320 |
| 8 | 1 | 0.90 | — | 0.10 | 0.82 | 318 |

(a) = terephthalic acid dichloride
(b) = 3-(1-methyl-phenyl-ethyl)-4,4'-dihydroxy-diphenyl
(c) = hydroquinone
(d) = 4,4'-dihydroxy-diphenyl The polymers of Examples 7 and 8 are optically anisotropic in the molten state.

EXAMPLE 9

Using the same equipment and procedures as those of Example 3, 1.92 g (9.48 mM) of terephthalic acid dichloride, 2.30 g (9.48 mM) of 3-(tert.-butyl)-4,4'-dihydroxy-diphenyl, and 44 cc of 1,2,4-trichlorobenzene are charged.

The polymerization time is 5 hours. At the end of this time, no further HCl develops.

The end product is dried under vacuum for 3 hours at 180° –185° C.

The dried polymer has a melting temperature ($T_m$) of 250° –300° C., and an inherent viscosity of 0.74.

The molten polymer is optically anisotropic under the polarized-light microscope.

EXAMPLE 10

To a 4-neck glass flask of 250 cc capacity, equipped with a mechanical stirrer, condenser, thermometer and nitrogen inlet tube, 4.0 g (19.72 mM) of terephthalic acid dichloride, 3.0 g (9.86 mM) of 3-(1-methyl-1-phenyl-ethyl)-4,4'-dihydroxy-diphenyl, 2.24 g (9.86 mM) of (1-methyl-1-phenyl-ethyl)-hydroquinone, and 92 cc of 1,2,4-trichlorobenzene are charged under a slow nitrogen stream.

The reaction mixture is maintained for 20 minutes at room temperature with stirring and under a nitrogen stream; the temperature is then increased up to 220° C.

The reaction mixture is maintained at this temperature for 16 hours. At the end of this time, the evolution of HCl is practically ended.

The reaction mixture is allowed to cool down, still with stirring and under a nitrogen stream. When the reaction mixture has reached the temperature of 50° C., the jelly-like mixture is poured into acetone, and the precipitate is filtered off.

The so-obtained polymer is washed with acetone (twice), hot water (twice), and acetone/methanol (twice).

The end product is dried under vacuum for 2 hours and 30 minutes at 180° –190° C.

The dried polymer is amorphous and has a $T_g$ (glass transition temperature) of 159° C.

The inherent viscosity of the polymer is 1.12 (as measured at the temperature of 30° C. in a solvent composed of equal volumes of trichloroacetic acid and methylene chloride, at the concentration of 0.25 g/liter).

When observed under the polarized light microscope equipped with a heating stage, the polymer is optically anisotropic the fluid state.

EXAMPLE 11

By means of the same equipment and procedure as those of the test of Example 10, 4.98 g (24.52 mM) of terephthalic acid dichloride, 3.56 g (12.26 mM) of 3-(phenylethyl)-4,4'-dihydroxy-diphenyl, 2.62 g (12.26 mM) of (phenylethyl)-hydroquinone, and 110 cc of 1,2,4-trichlorobenzene are charged.

The polymerization time is 12 hours. At the end of this time, practically no further HCl develops.

The end product is dried for 3 hours at 170° C.

The dried polymer is amorphous, has a $T_g$ of 147° C., and a inherent viscosity of 1.22.

When observed under the polarized light microscope equipped with a heating stage, the polymer is optically anisotropic in the fluid state.

EXAMPLE 12

By means of the same test equipment and procedure as those of Example 10, 5.46 g (27 mM) of terephthalic acid dichloride, 4.11 g (13.5 mM) of 3-(1-methyl-1-phenyl-ethyl)-4,4'-dihydroxy-diphenyl, 2.49 g (13.5 mM) of phenylhydroquinone, and 120 cc of 1,2,4-trichlorobenzene are charged.

The polymerization time is 16 hours. At the end of this time, practically no further HCl develops.

The end product is dried for 3 hours at 180° C.

The dried polymer is amorphous, has a $T_g$ of 148° C., and an inherent viscosity of 0.88.

When observed under the polarized light microscope equipped with a heating stage, the polymer is optically anisotropic in the fluid state.

EXAMPLE 13

To a 4-neck glass flask of 100 cc capacity, equipped with mechanical stirrer, nitrogen inlet tube, thermometer and distillation head, 3.09 g (22.4 mM) of p-hydroxybenzoic acid, 3.72 g (22.4 mM) of terephthalic acid, 6.50 g (22.4 mM) of 3-phenyl-ethyl)-4-4'-dihydroxy-diphenyl, 0.30 g of trisodium phosphate dodecahydrate, 8.5 g of acetic anhydride, and 20 g of di-phenyl-sulphone are charged under a slow nitrogen stream.

Under a slight nitrogen stream, and with stirring, the rection mixture is heated to 140° C. by means of a high-temperature silicone oil bath.

The reaction mixture is maintained at this temperature for 1 hour, and acetic acid begins to distill.

The temperature is then increased up to 240° C., and is maintained at this value for a further hour.

The oil bath is heated at 270° C. for 40 minutes, at 290° C. for 30 minutes, and finally, at 320° C. for a further 30 minutes.

The reaction mixture is allowed to cool to room temperature, still under a slight nitrogen stream, and the solid mass which is obtained is finely ground.

The so-obtained powder is washed twice with acetone, twice with water, and twice with acetone/methanol.

The end product is dried under vacuum for 2 hours and 30 minutes at 150° C.

The so-obtained polymer is amorphous, has a $T_g$ of 135° C., and an inherent viscosity of 1.31.

When observed under the polarized light microscope equipped with a heating stage, the polymer is optically anisotropic in the fluid state.

What is claimed is:

1. A thermotropic liquid-crystalline aromatic polyester which comprises:
   (a) at least one unit derived from an essentially mono-substituted phenol having the formula:

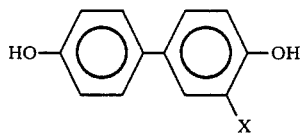

(1)

wherein:

X represents a halogen or an alkyl radical containing from 1 to 6 carbon atoms, an aralkyl radical containing at least 7 carbon atoms, a cycloalkyl, a single, double or condensed aryl radical containing from 6 to 18 carbon atoms, a keto group —COR or an ether group —OR, wherein R is an alkyl or aryl radical containing from 1 to 12 carbon atoms, optionally substituted with halogens or alkyl radicals with a small number of carbon atoms;

(b) at least one unit derived from a dicarboxy acid of the formula:

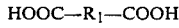    (2)

wherein:

$R_1$ represents a cycloalkylene, a single, double or condensed arylene radical containing from 6 to 18 carbon atoms, optionally substituted with halogens or alkyl radicals containing a small number of carbons atoms;

(c) optionally at least one unit derived from a hydroxyacid of the formula:

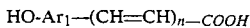    (3)

wherein:

$Ar_1$ represents a single, double or condensed arylene radical containing from 6 to 18 carbon atoms, optionally substituted with halogens or alkyl radicals containing a small number of carbon atoms, and n is either 0 or 1; and (d) optionally at least one unit derived from a diphenol having the formula:

    (4)

wherein:

$Ar_2$ represents a single or condensed arylene radical containing from 6 to 18 carbon atoms, optionally substituted with at least one X radical, or a double, unsubstituted aryl radical.

2. Polyester according to 1, wherein at least 90 mol % of the units of the formulae (2), (3), and (4) have their two functional groups in such positions as to form the polymeric chain in a substantially coaxial or parallel direction.

3. Polyester according to claims 1, wherein the substituted diphenols of the formula (1) are selected from the group consisting of chloro or bromo 4,4'-dihydroxy-diphenyl; methyl, ethyl, propyl or butyl 4,4'-dihydroxy-diphenyl; tert.-buthyl-4,4'-dihydroxy-diphenyl; cyclohexyl-4,4'-dihydroxydiphenyl; phenyl-ethyl-4,4'-dihydroxy-diphenyl; (1-methyl-1-phenyl-ethyl)-4,4'-dihydroxy-diphenyl; naphthyl-4,4'-dihydroxy-diphenyl; acetyl-4,4'-dihydroxy-diphenyl; propionyl-4,4'-dihydroxy-diphenyl; benzoyl-4,4'-dihydroxy-diphenyl; methoxy4,4'-dihydroxy-diphenyl; phenoxy-4,4'-dihydroxy-diphenyl; phenyl-4,4'-dihydroxy-diphenyl.

4. Polyester according to claim 1, wherein the dicarboxy aromatic acids having the formula (2) are selected from the group consisting of terephthalic acid, chloro or bromoterephthalic acid, methyl-terephthalic acid, 1,4-naphthalene-dicarboxy acid, 1,5-naphthalene-dicarboxy acid, and 2,6-naphthalene-dicarboxy acid, 4,4'-diphenyl-dicarboxy acid, 3,3'-dibromo-4,4'-diphenyl-dicarboxy acid, 4,4'-stilbenedicarboxy acid, and phenyl-4,4'-dihydroxydiphenyl.

5. Polyester according to claim 1, wherein the hydroxy acids having the formula (3) are selected from the group consisting of p-hydroxy-benzoic acid; 3-chloro-4-hydroxy-benzoic acid; 3-bromo-4-hydroxy-benzoic acid; 3,5-dichloro-4-hydroxy-benzoic acid; 3-methyl-4-hydroxybenzoic acid; 3-tert.-butyl-4-hydroxy-benzoic acid; 4-hydroxy-1-naphthoic acid; 6-hydroxy-2-naphthoic acid; p-(4-hydroxyphenyl)-benzoic acid; and p-hydroxycinnamic acid.

6. Polyester according to claim 1, wherein the aromatic diols of the formula (4) are selected from the group consisting of hydroquinone; methyl, ethyl, propyl or tert.-butyl-hydroquinone; phenyl-hydroquinone; (1-phenyl-ethyl)-hydroquinone; 2,5-bis(phenyl-ethyl)-hydroquinone; 2-(alpha-phenyl-isopropyl)-hydroquinone; 2,5-bis(alpha-phenylisopropyl)hydroquinone; cyclohexyl-hydroquinone; 4,4'-dihydroxy-diphenyl; and 2,6-dihydroxy-naphthalene.

7. Polyester according to claim 1, wherein the units derived from the phenols as defined under (d) are in molar ratios of (d)/(a) to the units derived from such hydroxyacids as defined under (a), which are within the range of from 0 to 1, whilst the units derived from the hydroxy acids as defined under (c) are in molar ratios of (c)/(b) to the units derived from the acids, as defined under (b), which are within the range of from 0 to 4.

8. Polyester according to claim 1, having an inherent viscosity, measured in a 1:1 mixture of trifluoroacetic acid and methylene chloride at 30° C. or pentafluorophenol at 60° C., at a concentration of 0.25 g/liter, within the range of from 0.3 to 4, and a melting temperature within the range of from 200° to 350° C.

9. A fiber, film, body formed by injection or extrusion, or a matrix for composite materials based on inorganic fibers or fillers, comprising a polyester according to claim 1.

10. A polyester according to claim 1, wherein X in formula (1) represents an aralkyl radical containing from 7 to 15 carbon atoms.

* * * * *